Figure 1:
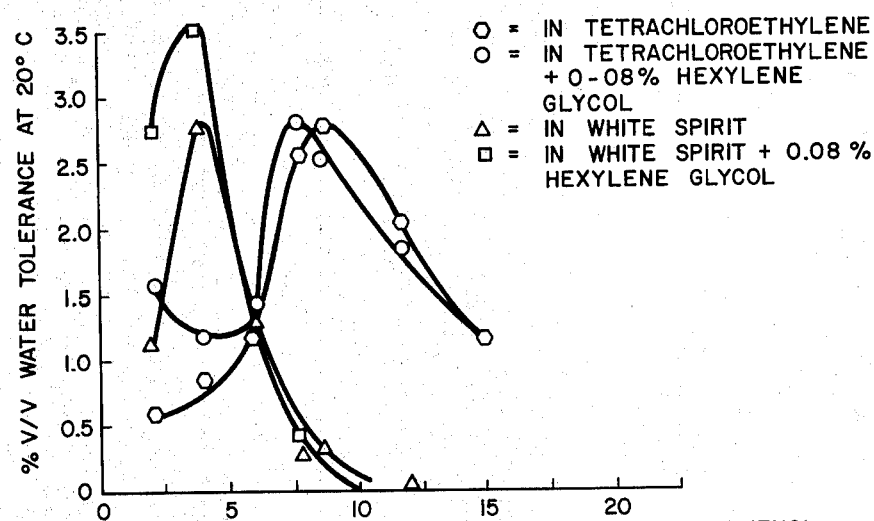

NUMBER OF ETHYLENE OXIDE MOLS CONDENSED WITH OCTYL PHENOL

WATER TOLERANCE OF 1:1 MIXTURES OF K (C10-C13) ALKYL BENZENE SULPHONATES AND OCTYL PHENOL CONDENSATES 3.2% A. M. CONCENTRATIONS IN BATHS AT 20° C

WATER TOLERANCE IN TETRACHLOROETHYLENE AND WHITE SPIRIT OF K (C10-C13) ALKYL BENZENE SULPHONATES AND OCTYL PHENOL CONDENSATES

INVENTOR:
WALTER V. BARNES

3,222,286
DRY CLEANING COMPOSITION
Walter V. Barnes, Brixham, Devon, England, assignor to Shell Oil Company, New York, N.Y., a corporation of Delaware
Filed Oct. 19, 1962, Ser. No. 231,624
Claims priority, application Great Britain, Nov. 29, 1961, 42,660/61
4 Claims. (Cl. 252—161)

The present invention relates to detergent containing compositions which are particularly suitable for use as dry cleaning aids.

When garments are dry cleaned in an organic solvent which contains no dry cleaning aid, the process removes much of the soil of a greasy nature and also some insoluble soil. However much of the hydrophilic or water-soluble soil is left on the fabric. Spots of hydrophilic soil have to be removed by a separate process known as "spotting." This process involves the individual treatment of each spot on each garment with a mixture of water and certain chemicals and is a labor-consuming and consequently expensive process.

By introducing a dry cleaning aid into the dry cleaning solvent bath, three advantageous results are achieved. First, by virtue of their detergent properties they facilitate the removal of soil from garments. Secondly by enabling the dry cleaning solvent to dissolve small amounts of water, they result in the removal of hydrophilic soil. Thirdly by suspending soil they prevent redeposition and therefore improve the brightness of the cleaned garment.

According to the present invention compositions which are stable and have a high water carrying capacity and are suitable as dry cleaning aids for addition to dry cleaning baths are ones comprising an alkyl aryl sulfonate or aryl sulfonate and certain defined phenol-, alcohol- or mercaptan-alkylene oxide condensates.

A composition suitable for use in white spirit or perchloroethylene dry cleaning baths comprises at least 10% by weight based on the total composition of a hydrocarbon or halogen substituted hydrocarbon solvent, and a mixture in a weight ratio of between 10:90 and 70:30 of an alkyl aryl sulfonate or any aryl sulfonate and a phenol-, alcohol or mercaptan-alkylene oxide condensate having an average between six and twelve inclusive alkylene oxide units per molecule. In a slightly modified composition also suitable for use in white spirit or perchloroethylene dry cleaning baths the phenol-, alcohol- or mercaptan-alkylene oxide condensate having an average of between six and twelve inclusive alkylene oxide units per molecule is replaced to an extent of between 40 and 60 percent by weight by a phenol-, alcohol- or mercaptan-alkylene oxide condensate having an average of between two and five inclusive alkylene oxide units per molecule. A composition suitable for use in white spirit but not perchloroethylene dry cleaning baths comprises at least 10% by weight based on the total composition of a hydrocarbon solvent, and a mixture in a weight ratio of between 10:90 and 70:30 of an alkyl aryl sulfonate or an aryl sulfonate and a phenol-, alcohol- or mercaptan-alkylene oxide condensate having an average of between two and five inclusive alkylene oxide units per molecule.

The hydrocarbon solvents are preferably aromatic hydrocarbons or highly aromatic hydrocarbons although aliphatic, e.g., paraffinic hydrocarbons such as gasoline or ligroin may be used. Suitable aromatic hydrocarbon solvents are benzene, toluene, xylene and other low boiling aromatic hydrocarbons. Other suitable solvents are mixtures of aliphatic and aromatic hydrocarbons for example white spirits, especially those supplied to the Stoddard Specification; i.e., they are petroleum distillates having a flash point of at least 100° F. and distilling to not less than 50% at 350° F. with the end point not being higher than 410° F. Other suitable hydrocarbon solvents are the high boiling highly aromatic hydrocarbon solvents, e.g. those having an aromatic content of between 80% and 99% by volume. The boiling ranges of such high boiling solvents may vary, e.g., 205–275° C., 185–215° C., 160°–180° C., 153° C.–195° C. or 213°–277° C. A preferred solvent is that having an initial boiling point of between 160° and 165° C., a final boiling point of between 270° and 275° C., 20% by volume boiling over at between 185° and 190° C., 50% by volume between 205° and 215° C., and 90% by volume between 250° and 255° C. This preferred highly aromatic solvent is a mixture comprising butyl and higher alkyl benzenes and tri- and tetra-methyl and tri- and tetra-higher alkyl benzenes. Other suitable solvents are lubricating oils of low viscosity, especially pale spindle oil.

Although halogen substituted aromatic hydrocarbons, e.g., chlorobenzene may be used, halogen substituted aliphatic hydrocarbons are preferred. Thus, preferred halogen substituted hydrocarbon solvents are carbon tetrachloride, or perchloroethylene (tetrachloroethylene), although trichloroethylene or fluorinated propanes can be used.

The quantity of solvent in the compositions of the present invention is preferably not more than 75% by weight of the total composition. Suitable proportions are between 15% and 30% by weight, e.g., 17 to 19% or 25 to 27% by weight of the total composition.

The alkyl aryl sulfonates which are used in the compositions of the present invention are the sulfonic acids themselves or preferably the water soluble salts thereof. Although alkyl naphthalene sulfonates, e.g., propylated naphthalene sulfonates, the mixed butyl naphthalene sulfonates or tetrahydronaphthalene sulfonates, or other alkyl aryl sulfonates such as butylated diphenyl sulfonates or phenylphenol sulfonates may be used, the alkyl benzene sulfonates are preferred.

The alkyl aryl sulfonates may be mono-alkyl or poly-alkyl aryl sulfonates and the alkyl chains may be straight or branched. The preferred alkyl aryl sulfonates are those in which each alkyl group contains between 8 and 20 carbon atoms, e.g., between 10 and 13 carbon atoms. Particularly suitable alkyl aryl sulfonates for use in the compositions of the present invention are mixtures of alkyl aryl sulfonates, especially wherein all the alkyl aryl sulfonates in a range, e.g., $C_8$ to $C_{13}$ alkyl benzene sulfonates, are present.

Examples of suitable alkyl aryl sulfonates are the sulfonates of the hydrocarbons obtained by the alkylation of an aromatic hydrocarbon of the benzene series, particularly benzene or toluene, with an alkylating agent having between 8 and 16 carbon atoms per molecule, e.g., an olefin, an olefin polymer or an alkyl halide. U.S. specifications 2,467,130–132, and British specification 645,129, for example, describe secondary alkyl aryl sulfonates which can be used. The keryl benzene, toluene and other sulfonates described in U.S. 2,340,654 can also be used. The preferred sulfonates are the sulfonates of the hydrocarbons obtained by alkylating benzene with a mixture of $C_{10}$, $C_{11}$, $C_{12}$ and $C_{13}$ 1-olefins.

Alkaline earth metal, e.g., calcium, alkanolamine, e.g., ethanolamine, or ammonium alkyl aryl sulfonates may be used, but alkali metal salts are preferred. Thus sodium or lithium alkyl aryl sulfonates may be used, but the preferred salts are the potassium salts.

The aryl sulfonates which may be used in compositions of this invention, can be obtained by sulfonation of an aryl hydrocarbon, e.g., by sulfonation of benzene or naphthalene to form benzene or naphthalene sulfonic acids. These acids may be neutralized to form the corresponding salts, e.g., alkali metal, ammonium or alkanolamine salts. Examples of such salts are sodium or potassium benzene sulfonates.

In general, however, alkyl aryl sulfonates are preferred to aryl sulfonates.

The alkylene oxide/phenol, alkylene oxide/alcohol or alkylene oxide/mercaptan condensates used in compositions of the present invention may be derived from any alkylene oxide, but preferably from alkylene oxides containing between two and four inclusive carbon atoms in the molecule. The preferred alkylene oxides are ethylene oxide or 1,2-propylene oxide. Other suitable alkylene oxides are 1,2- and 2,3-butylene oxides, and isobutylene oxide. Any method suitable for the preparation of these condensates can be used. One such method comprises treating inter alia a phenol or alcohol with one or more alkylene oxides in the presence of an alkali catalyst, treating with an acid and subsequently treating with a lower aliphatic alcohol or glycol and removing the suspended solid material and the alcohol or glycol from the polyoxyalkylene compound.

Alkylene oxide/phenol and alkylene oxide/alcohol condensates may also be prepared using mixtures of alkylene oxides. Thus, for example, if a mixture of ethylene oxide and 1,2-propylene oxide is employed, a polyoxyalkylene compound is formed in which the ethylene oxide and propylene oxide units are distributed randomly throughout the polyoxyalkylene compound in substantially the same proportions as the alkylene oxides are present in the mixture used. Alternatively, two different alkylene oxides may be used alternately, or several different alkylene oxides may be used successively so giving block copolymers. One method of making these block copolymers is by condensing an organic compound containing at least one hydroxyl group, e.g., a phenol or an alcohol, at an elevated temperature and in the presence of a condensation catalyst, with one or more equivalents of an alkylene oxide subsequently with one or more equivalents or an alkylene oxide different from the first alkylene oxide, and then with one or more equivalents of an alkylene oxide different from the second alkylene oxide. Suitable condensation catalysts are strong bases, e.g., a quaternary ammonium base on sodium hydroxide, or compounds such as boron trifluoride, sulfuric or phosphoric acids. Similarly, alkylene oxide/mercaptan condensates of this type may be prepared by first condensing the mercaptan with one alkylene oxide, and then subsequently reacting the mercapto alcohol thus formed with another alkylene oxide.

When preparing these alkylene oxide condensates, by controlling the proportions of the reactants, the number of alkylene oxide units per unit of phenol, alcohol or mercaptan can be controlled. Thus, the condensates containing an average of between two and five inclusive alkylene oxide units per molecule, and condensates containing an average of between six and twelve inclusive alkylene oxide units per molecule may be readily prepared. Particularly preferred condensates are respectively, those containing an average of between 3 and 5 moles of alkylene oxide per mole of phenol, alcohol or mercaptan, e.g., an average of 4 moles of alkylene oxide per mole of phenol, alcohol or mercaptan and those containing an average of between 7 and 10 moles of alkylene oxide per mole of phenol, alcohol or mercaptan, e.g., an average of 8.5 moles of alkylene oxide per mole of phenol, alcohol or mercaptan.

The phenols from which the alkylene oxide/phenol condensates are derived include phenol itself, the cresols, resorcinol and the alkyl and dialkyl phenols. Preferred phenols are the alkyl phenols, and these are generally prepared by alkylating phenol with an olefin containing the desired number of carbon atoms. Preferred alkyl phenols are those in which the alkyl group contains between 4 and 10 carbon atoms inclusive, and a particularly preferred alkyl phenol is octyl phenol.

The alcohols from which the alkylene oxide/alcohol condensates are derived, include monohydric primary, secondary or tertiary alcohols, preferably those having between 6 and 20 carbon atoms inclusive in the molecule and more preferably between 12 and 18 carbon atoms inclusive in the molecule. Preferably aliphatic alcohols for example, lauryl alcohol, cetyl alcohol, oleyl acohol and 2-ethyl hexanol are used, but arylalkyl alcohols, for example, benzyl alcohol or the alkyl benzyl alcohols can be used.

Similarly, the mercaptan/alkylene oxide condensates may be derived from primary, secondary or tertiary mercaptans. Preferably the mercaptan has between 6 and 20 carbon atoms inclusive per molecule, especially between 12 and 18 carbon atoms inclusive per molecule. The mercaptan may be an aralkyl mercaptan but aliphatic mercaptans are preferred. Examples of suitable mercaptans are the primary, secondary or tertiary dodecyl or octadecyl mercaptans.

The alkylene oxide/phenol condensates especially the ethylene oxide/phenol condensates are preferred to the alkylene oxide/alcohol or alkylene oxide/mercaptan condensates.

In compositions of the present invention where either an alkylene oxide/phenol, alkylene oxide/alcohol or alkylene oxide/mercaptan condensate having an average of between two and five inclusive alkylene oxide units per molecule or condensates having an average of between six and twelve inclusive alkylene oxide units per molecule, but not mixtures of both short and long chain condensates are used, the ratio of alkyl aryl sulfonate or aryl sulfonate to condensate must be between 10:90 and 70:30, e.g., between 40:60 and 60:40 particularly about 50:50 by weight. In compositions of the present invention wherein both these two classes of condensate are present the ratio of alkyl aryl sulfonate or aryl sulfonate to total phenol-, alcohol- or mercaptan-alkylene oxide condensate must be between 10:90 and 70:30, e.g., between 40:60 and 60:40 particularly about 50:50 by weight, and the ratio of longer chain condensate to shorter chain condensate must be between 60:40 and 40:60, e.g., about 50:50 by weight.

The compositions of the present invention may also if desired include a minor proportion of a water-soluble solvent, e.g., a glycol, ketone or alcohol. Examples of suitable solvents are methanol, isopropanol, cyclohexanol, benzyl alcohol, methyl cyclohexanol, acetone, cyclohexanone and especially hexylene glycol. The proportion of water-soluble solvent should preferably be less than 5%, e.g., about 2% by weight of the total composition.

A minor proportion of water, preferably less than 10%, e.g., about 5% by weight based on the total composition may also be present in the compositions of the present invention if desired.

Dry cleaning aid compositions may be prepared by mixing together the required quantities of the components. It has been found, however, that better products are obtained by using the salts of alkyl aryl sulfonates or aryl sulfonates prepared in situ. According to the present invention therefore a composition suitable for use as a dry cleaning aid is prepared by dissolving an alkyl aryl sulfonic acid or an aryl sulfonic acid in a hydrocarbon solvent or a halogen-substituted hydrocarbon solvent, mixing therewith a base (preferably in a quantity at least sufficient to neutralize the sulfonic acid), and thereafter mixing the resulting solution with a phenol-alcohol or mercaptan-alkylene oxide condensate. The quantities of components and the nature of the phenol-, alcohol- or mercaptan-alkylene oxide condensate should preferably be such so as to result in compositions as hereinbefore described. The base, e.g., an alkali metal hydroxide such as potassium hydroxide, may be mixed with the sulfonic acid in solvent, as such or preferably as an aqueous solution.

Figure 2:
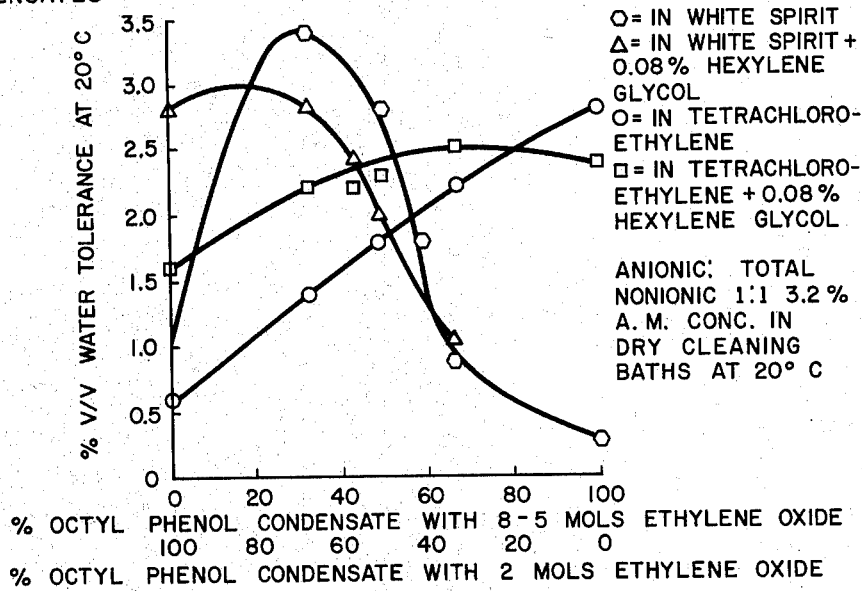

The effect on water carrying capacity of alkylene oxide chain length and the relative proportions of shorter and longer alkylene oxide chain length in compositions containing an alkyl aryl sulfonate and phenol alkylene oxide condensate is illustrated in FIGURES 1 and 2 of the accompanying drawings.

In FIGURE 1 of the drawing the effect of chain length of the octyl phenol condensate is shown. Octyl phenol condensates having respectively, an average of about 2, 3.8, 6, 8, 8.8, 12 and 15 ethylene oxide units per molecule of octyl phenol were used. The percentage by volume of water able to remain in clear solution in the dry cleaning bath was determined for each condensate in baths containing respectively tetrachloroethylene, tetrachloroethylene +0.08% hexylene glycol, white spirit and white spirit +0.08% hexylene glycol. It is clearly shown that for tetrachloroethylene containing baths, the optimum number of ethylene oxide units per mole of octyl phenol is between about six and twelve, and for white spirit containing baths between about two and five.

In FIGURE 2 of the drawing, the effect of varying the relative proportions of an octyl phenol/ethylene oxide condensate having an average of 8.5 ethylene oxide units per molecule and an octyl phenol/ethylene oxide condensate having an average of 2 ethylene oxide units per molecule in a 1:1 alkyl aryl sulfonate and octyl phenol/ethylene oxide containing mixture is shown. It is clear that the optimum relative proportions of longer to shorter chain condensates which are suitable for dry cleaning aids suitable for both white spirit or perchloroethylene baths are between about 40:60 and 60:40.

Example I

A dry-cleaning aid suitable for use in a perchloroethylene dry-cleaning bath was prepared by mixing together the following compounds in the quantities stated

| | Percent wt. |
|---|---|
| Potassium ($C_{10}$–$C_{13}$) alkyl benzene sulfonates | 31.25 |
| A condensate of octyl phenol with ethylene oxide having an average of 8.5 ethylene oxide units per molecule | 31.25 |
| Perchloroethylene | 26.50 |
| Hexylene glycol | 2.00 |
| Water | 9.00 |

Example II 13.8 parts by weight of a mixture of ($C_{10}$–$C_{13}$) alkyl benzene sulfonic acids were dissolved in 7.6 parts by weight of pale spindle oil. To the resulting solution 3.0 parts by weight of potassium hydroxide dissolved in 1.9 parts by weight of water was added, followed by 14.4 parts by weight of a condensate of octyl phenol with ethylene oxide having an average of 4 ethylene oxide units per molecule, and 0.8 part by weight of hexylene glycol.

The resulting solution was found to be suitable as a dry-cleaning aid for use in white spirit dry-cleaning baths.

Example III

A dry-cleaning aid equally suitable for use in a white spirit dry-cleaning bath was prepared by the same procedure as Example II using the same compounds in the same quantities with the exception that instead of 7.6 parts by weight of spindle oil, 7.6 parts by weight of a high boiling highly aromatic hydrocarbon solvent mixture having an initial boiling point of about 163° C. and a final boiling point of about 272° C. was used.

Example IV

Dry-cleaning aids also suitable for use in white spirit dry-cleaning baths were prepared by using the same procedures as in Examples II and III only omitting the addition of hexylene glycol.

Example V 13.8 parts by weight of a mixture of ($C_{10}$–$C_{13}$) alkyl benzene sulfonic acids was dissolved in 7.6 parts by weight of pale spindle oil. 3.0 parts by weight of potassium hydroxide dissolved in 1.9 parts by weight of water were added, and thereafter were added 7.2 parts by weight of a condensate of octyl phenol with an average of 2 ethylene oxide moles per mole of phenol, 7.2 parts by weight of a condensate of octyl phenol with an average of 8.5 ethylene oxide moles per mole of phenol, and 0.8 part by weight of hexylene glycol.

This mixture was suitable for use in both white spirit and tetrachloroethylene.

Example VI

Another dry-cleaning aid suitable for use in both white spirit and tetrachloroethylene was prepared by using the same procedure and components and quantities as Example V but substituting for 7.6 parts by weight of pale spindle oil 7.6 parts by weight of a high boiling highly aromatic hydrocarbon solvent mixture having an initial boiling point of about 163° C. and a final boiling point of about 272° C.

Example VII

A dry-cleaning aid suitable for use in both white spirit and tetrachloroethylene was prepared by using the same procedure, same components, and same quantities as in Example V except that 7.6 parts by weight of spindle oil was replaced by 12.2 parts by weight of tetrachloroethylene.

Example VIII

Suitable dry-cleaning aids were obtained by the procedure of Examples V, VI and VII but omitting the hexylene glycol.

I claim as my invention:

1. A detergent composition adapted for use in the dry cleaning of textiles consisting essentially of at least 10% and not more than 75% by weight of perchloroethylene and a mixture in the weight ratio between 60:40 and 40:60 of (a) alkali metal ($C_{10}$–$C_{13}$)-alkyl benzene sulfonate and (b) ($C_4$–$C_{10}$)-alkyl phenol-ethylene oxide condensation product in which the alkyl phenol is condensed with between 7 and 10 moles of ethylene oxide.

2. A detergent composition in accordance with claim 1 wherein the alkali metal sulfonate is potassium sulfonate and wherein the ($C_4$–$C_{10}$)-alkyl phenol is octyl phenol and the octyl phenol is condensed with an average of 8.5 moles of ethylene oxide.

3. A detergent composition adapted for use in the dry cleaning of textiles consisting essentially of at least 10% and not more than 75% by weight of white spirits and a mixture in the weight ratio between 60:40 and 40:60 of (a) alkali metal ($C_{10}$–$C_{13}$)-alkyl benzene sulfonate and (b) ($C_4$–$C_{10}$)-alkyl phenol-ethylene oxide condensation product in which the alkyl phenol is condensed with between 3 to 5 moles of ethylene oxide.

4. A detergent composition in accordance with claim 3 wherein the alkali metal sulfonate is potassium sulfonate and wherein the ($C_4$–$C_{10}$)-alkyl phenol is octyl phenol.

References Cited by the Examiner

UNITED STATES PATENTS

| 2,574,528 | 11/1951 | Brewer | 252—171 XR |
| 2,697,075 | 12/1954 | Echols | 252—170 |
| 2,787,594 | 4/1957 | Stewart | 252—161 XR |
| 2,941,952 | 6/1960 | Lewis et al. | 252—161 |
| 2,946,721 | 7/1960 | Hyatt et al. | 252—161 XR |
| 3,018,251 | 1/1962 | Mayhew et al. | 252—161 XR |

JULIUS GREENWALD, *Primary Examiner.*